United States Patent [19]

Faulconer

[11] 4,387,587

[45] Jun. 14, 1983

[54] MOTOR VEHICLE DECELERATION DATA ACQUISITION AND PROCESSING APPARATUS AND METHODOLOGY

[76] Inventor: Boyd M. Faulconer, R.R. #1, Smithville, Mo. 64089

[21] Appl. No.: 274,416

[22] Filed: Jun. 17, 1981

[51] Int. Cl.$^3$ .............................................. G01N 19/02
[52] U.S. Cl. ................................................ 73/9; 73/489
[58] Field of Search .................. 73/9, 121, 125, 128, 73/146, 129, 488, 489, 514, 517 R; 364/426

[56] References Cited

U.S. PATENT DOCUMENTS

| | | | |
|---|---|---|---|
| 2,198,278 | 4/1940 | Van Der Heiden | 73/9 X |
| 2,495,340 | 1/1950 | Milster | 73/128 |
| 3,482,453 | 12/1969 | Clarke | 73/121 X |
| 3,538,742 | 11/1970 | Benning | 73/9 |
| 3,893,330 | 7/1975 | Shute et al. | 73/9 |
| 4,020,286 | 4/1977 | Ceci . | |
| 4,051,713 | 10/1977 | Bao et al. | 73/9 |
| 4,098,111 | 7/1978 | Hardmark et al. | 73/9 |

FOREIGN PATENT DOCUMENTS 55-155228  12/1980  Japan ..................................... 73/146

*Primary Examiner*—James J. Gill
*Attorney, Agent, or Firm*—Litman, Day and McMahon

[57] ABSTRACT

The decelerating movement of a vehicle during a skid test is sensed by an accelerometer which provides an analog signal representative of the deceleration to a computer where the analog signal is periodically sampled and converted into a digital deceleration signal for storing in a computer memory. Alternatively, the decelerating movement of the vehicle may be sensed by a radar speed detector providing digital signals representative of the initial speed and final speed of a time increment to a computer processor which records and stores the digital speed signals in computer memory to be later recalled to produce a digital deceleration signal. The computer processor effects storing of the digital deceleration signals in the computer memory at the beginning of a skid test when the magnitude of the signals exceeds a predetermined threshold level as sensed by a threshold level detector or, alternatively, when a mercury position switch is operated by the deceleration force. Subsequently, the stored deceleration data is retrieved from the computer memory by the processor for performing selected mathematical operations on the data to derive information such as the coefficient of friction encountered by the skidding vehicle, the length of the skid, and the time duration of the skid. The results of the mathematical operations may be displayed on a digital display panel or printed on a tape to provide a permanent record.

12 Claims, 5 Drawing Figures

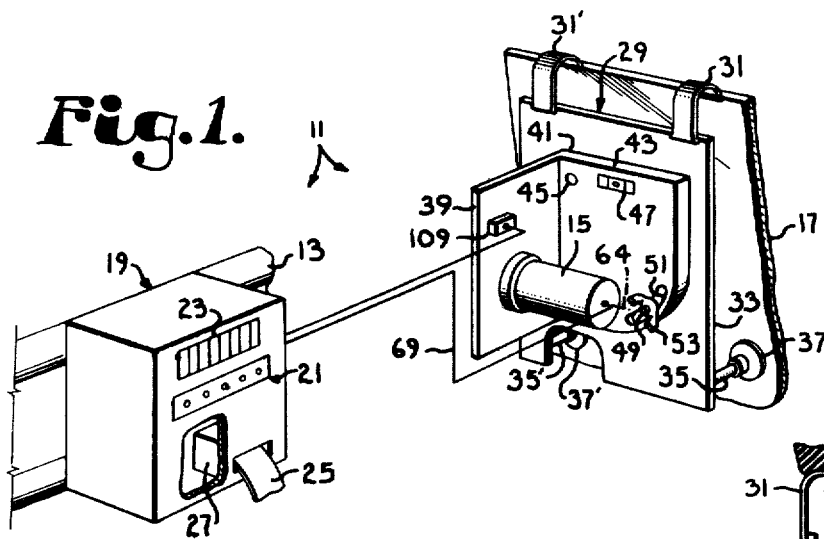
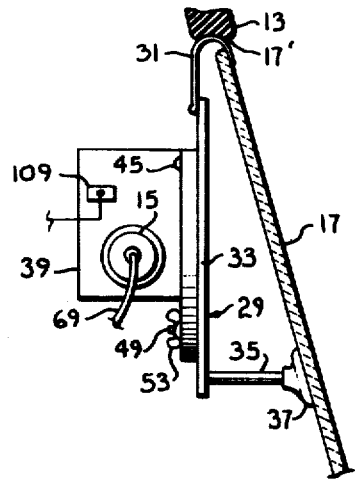
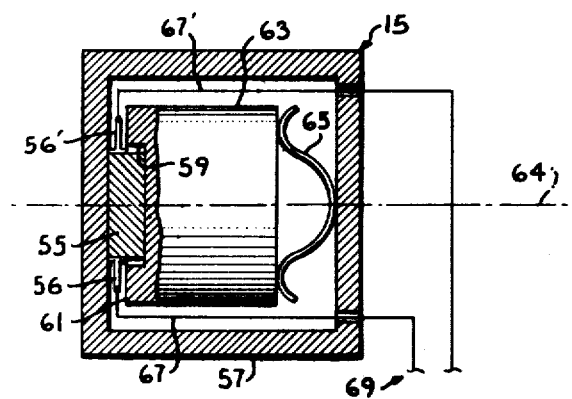
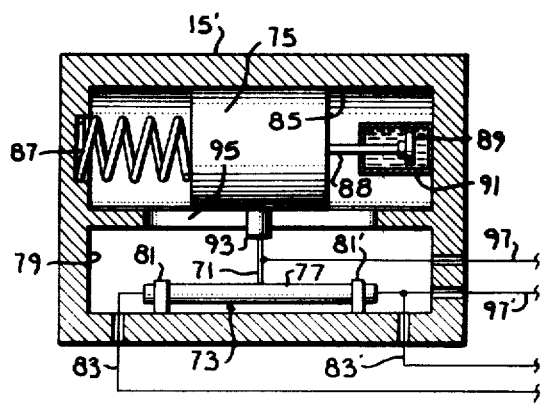

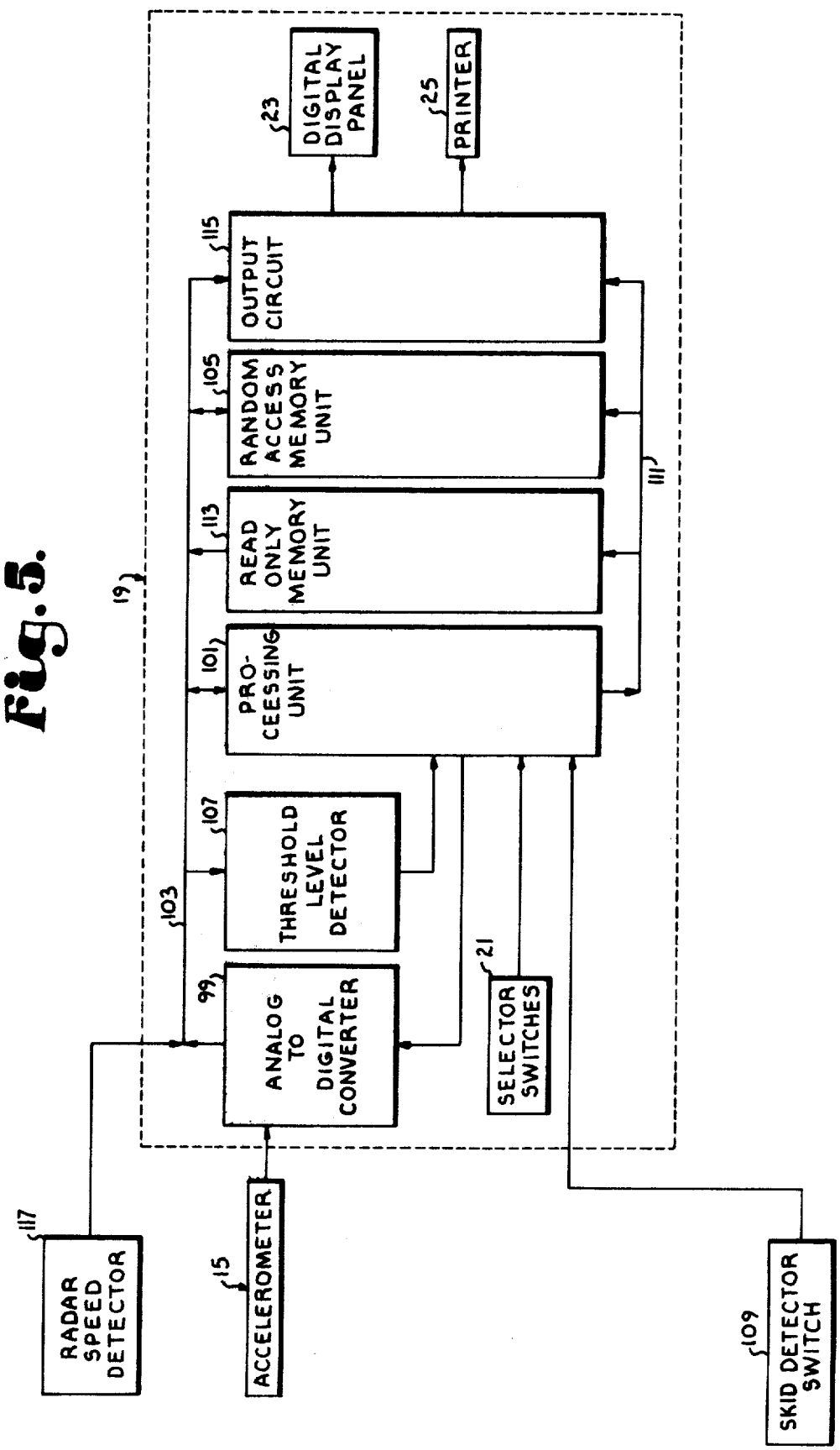

MOTOR VEHICLE DECELERATION DATA ACQUISITION AND PROCESSING APPARATUS AND METHODOLOGY

BACKGROUND OF THE INVENTION

This invention relates to the measurement of road surface friction encountered by a vehicle skidding along a road, and more particularly to a method and an apparatus for obtaining data concerning the deceleration of a vehicle during a skid test and processing the deceleration data to determine such factors as the length of the skid and the coefficient of friction between the road surface and the skidding vehicle.

In a skid test, a vehicle is driven along a road at an initial speed, and then the brakes of the vehicle are applied so as to lock the wheels of the vehicle and cause it to skid to a stop. As is known, a vehicle skidding to a stop will leave skid marks, and the length of such a skid mark is indicative of both the speed of the vehicle when the skidding began and the road surface friction which is expressed as a coefficient of friction. However, during a skid test a vehicle also undergoes deceleration, and the rate of deceleration and the time required for the decelerating vehicle to skid to a stop from an initial speed are also indicative of the coefficient of friction and the length of the skid.

In the past, law enforcement agencies have utilized the skid marks of a motor vehicle involved in an accident to estimate a minimum speed that the accident vehicle was traveling when the skidding began. However, before estimating the speed of the accident vehicle it is first necessary to determine the coefficient of friction for the particular section of road where the accident occurred, and this is accomplished by performing a skid test over the particular road section. The speed of the test vehicle when same begins skidding, is often determined by a conventional radar speed detector, and upon measuring the length of the resulting skid marks the coefficient of friction may be calculated according to the formula:

Coefficient of Friction=(speed of test vehicle in miles per hour)$^2$/F×(length of skid test in feet) wherein F as used herein is a constant equal to [(3600 seconds)$^2$× miles$^2$×2×32 feet/second$^2$×hours$^2$×(5280 feet)$^2$] or [29.75 miles$^2$/hour$^2$-feet] or as is usually rounded to a value of 30.

However, in determining the coefficient of friction by a method utilizing the length of the skid marks, it is important to accurately located the point at which the test vehicle began skidding, and this is usually accomplished by having personnel along the side of the road to actually witness the lock-up of the wheels. Afterwards, the personnel must move onto the road to measure the length of the skid marks left by the test vehicle. Such a procedure is disadvantageous because of the amount of time it requires and the number of personnel involved in witnessing the wheel lock up. Moreover, since the skid test must be performed along the section of road where an accident occurred, the test necessarily involves stopping or diverting traffic from that area, and if traffic is allowed to resume on a limited basis while the skid marks are being measured, then those measuring the skid marks are exposed to potential traffic hazards.

In the past, apparatus has been developed for measuring the coefficient of friction without requiring personnel to witness a wheel lock-up or to measure the length of skid marks, but such measuring apparatus usually involves bulky and relatively expensive equipment in the form of an extra wheel or a trailer to be towed along the road behind a vehicle. Due to the bulkiness, such measuring apparatus is unsuitable for being carried as standard equipment in a law enforcement vehicle, and accordingly the measuring apparatus must be brought to the scene of an accident from a storage location which may be many miles away. This necessarily involves a delay in measuring the coefficient of friction, and a further delay may be incurred when the measuring apparatus is not readily available but perhaps is being used elsewhere. During such delays conditions may change on the road surface to substantially modify the coefficient of friction associated therewith. However, the principal factors affecting the value of the coefficient of friction at the scene of an accident may be the presence of ice, snow, water, debris or foreign particles on the surface of the road. When such factors may vary substantially in a relatively short period of time due to changes in the weather or the passage of traffic, it is desirable to minimize any delay in measuring the coefficient of friction.

It is further noted that the present invention may be utilized to appraise users of a roadway with information relevant to surface conditions, especially a relative braking efficiency as compared to a clean and dry surface. Such information may be provided to aircraft pilots landing on airport runways, automobile drivers during inclement weather, and the like.

OBJECTS OF THE INVENTION

Accordingly, an object of the present invention is to provide a method for determining the coefficient of friction encountered by a vehicle during a skid test without measuring the length of the skid.

Another object of the invention is to provde a method for determining the coefficient of friction encountered by a vehicle during a skid test by calculations involving measurements of the deceleration of the vehicle during the skid test.

A further object of the present invention is to provide a compact and easily portable apparatus for determining the coefficient of friction encountered by a vehicle during a skid test, preferably such that same may be carried as standard equipment in a law enforcement vehicle so as to minimize any delay in measuring the coefficient of friction at the scene of an accident.

An additional object of the invention is to provide an apparatus for obtaining a deceleration history of a vehicle during a skid test and processing that information to determine the coefficient of friction encountered by the vehicle during the skid test.

Other objects and advantages of this invention will become apparent from the following description taken in connection with the accompanying drawings wherein are set forth, by way of illustration and example, certain embodiments of the invention.

The drawings constitute a part of this specification including exemplary embodiments of the present invention and illustrate various objects and features thereof.

BRIEF DESCRIPTION OF THE DRAWINGS

FIG. 1 is a perspective view of a test apparatus according to the present invention and illustrating the mounting of an accelerometer portion of the test apparatus in a vehicle for use during a skid test, wherin portions are broken away to show details thereof.

FIG. 2 is an end view in reduced scale of the accelerometer portion of the test apparatus illustrating the manner in which it is removably secured to a window of the vehicle.

FIG. 3 is a partially diagrammatic and cross-sectional illustration in enlarged scale of a piezoelectric interior of the accelerometer portion for use in the test apparatus.

FIG. 4 is a partially diagrammatic and cross-sectional illustration of an alternative variable-resistance interior of an accelerometer portion for use in the test apparatus.

FIG. 5 is a schematic block diagram illustrating the operation of electrical circuitry of the test apparatus.

DETAILED DESCRIPTION OF THE PREFERRED EMBODIMENTS

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring now in detail to the figures in the drawing, and more particularly to FIG. 1, there is shown, partly diagrammatically, a test apparatus which is generally indicated by the reference numeral 11 and which is mounted in a motor vehicle, generally indicated 13, for obtaining data regarding the deceleration of the vehicle 13 during a skid test. The test apparatus 11 includes an accelerometer, generally indicated by the numeral 15, which is secured on a door window 17 of the vehicle 13 for sensing the decelerating movement of the vehicle 13 during a skid test and providing a signal representative of the deceleration to an analytical means or computer, generally indicated by the reference numeral 19, which may be energized by a suitable self-contained or vehicle carried battery source, not shown. To obtain a deceleration history of the vehicle 13 during a skid test, a signal from the accelerometer 15 is periodically sampled and a value corresponding to the deceleration as a function of time is stored in the computer 19 as will be explained below in further detail. Subsequently, the stored deceleration data may be processed in the computer 19 according to one or more predetermined mathematical operations by operating one of a plurality of selector switches 21 corresponding to a desired mathematical operation. The results of such mathematical operations are shown on a digital display panel 23 or printed on a tape 25 by a printer 27 to provide a permanent record. Alternatively, if the computer 19 has a volatile memory, the deceleration data may be recorded magnetically by a suitable recorder, not shown, for processing in the computer 19 at a later time or the deceleration data may be displayed on an x-y coordinate graphic mechanism, not shown, with respect to time. The battery source and the recorder are not shown since they are peripheral to the present invention and many conventional devices may be utilized for such devices.

In performing a skid test in which the vehicle 13 skids along the road in essentially a straight line, the accelerometer 15 may be of the type sensing deceleration (negative acceleration) along a single axis, but the axis must be level with the surface of the road and generally aligned with the forward movement of the vehicle 13. As shown in FIGS. 1 and 2, the accelerometer 15 is removably secured to the door window 17 by a mounting assembly, generally indicated 29, having a pair of hook-shaped clips 31, 31' which are hooked over the top of a window glass 17' and pressed against the top of the door window 17 by raising the window glass 17'. The clips 31, 31' are connected by hinging to the top of a mounting plate 33 which is held away from the window glass 17' by a pair of spacing rods 35, 35' each suitably fastened at one end to a lower portion of the mounting plate 33 and carrying an adjustable rubber suction cup 37, 37' respectively, on the other end for engagement with the window glass 17'.

As shown, the accelerometer 15 is suitably mounted on one side 39 of an L-shaped bracket 41 while the other side 43 of the L-shaped bracket 41 is pivotally carried on the mounting plate 33. Assuming the vehicle 13 is on a level road section, the axis of the accelerometer 15 may be horizontally leveled with the surface of the road by rotating the bracket side 43 about a pivot 45 to a level position as may be indicated by a spirit level 47 previously aligned with the axis of the accelerometer 15 and suitably attached to the bracket side 43. To secure the bracket side 43 in a desired horizontally aligned position, the mounting plate 33 also has a threaded bolt 49 which is slidably received through an arcuate slot 51 in the bracket side 43 and a threaded wing nut 53 is threaded onto the bolt 49 to clamp the bracket side 43 to the mounting plate 33.

In a first embodiment, the accelerometer 15 may be of the piezoelectric type, such as shown partly diagrammatically in FIG. 3. Referring to FIGS. 1 and especially 3, a suitable piezoelectric crystal 55 is mounted in a cylindrical housing 57 and is partially received in a recess 59 formed in one end 61 of a cylindrical member 63 which is held against the piezoelectric crystal 55 by a spring clamp 65 pressing against the opposite end of the cylindrical member 63 and the cylindrical housing 57. The end of the housing 57 adjacent the piezoelectric crystal 55 may be suitably mounted to the bracket side 39 of the mounting assembly 29 so that a deceleration force will cause the cylindrical member 63 to move along a mechanical axis 64 of the crystal 55 and thereby compress the piezoelectrical crystal 55 along the axis 64 so as to produce a voltage across a pair of electrodes 56,56' atached to the crystal 55 and connected to electrical conductors 67, 67' respectively. The resulting electrical signal, which is instantaneously representative of the deceleration, may be supplied to the computer 19 by a coaxial cable 69 connected to the conductors 67, 67'.

An alternative accelerometer 15' is of a variable resistance type such as is diagrammatically illustrated in FIG. 4 wherein a wiper contact 71 of a potentiometer, generally indicated by the numeral 73, is carried by a cylindrical member 75 for movement along an elongated resistance element 77 of the potentiometer 73 in response to a deceleration force. As shown, the ends of the elongated resistance element 77 are supported in a housing 79 by a pair of electrically insulating holders 81, 81', and the resistance element 77 is connected by a pair of electrical conductors 83, 83' respectively, for energization from a suitable electrical source, for example the battery source used to energize the computer 19. The member 75 is slidably supported in a cylinder 85 defined within the housing 79 with a spring 87 compressed between one end of the cylinder 85 and the member 75 for urging it to a quiescent position, while the other end of the member 75 is connected by a rod 88 to a piston 89 of a dashpot 91 secured to the other end of the cylinder 87 so as to dampen any minor fluctuations. The wiper contact 71 is secured to the cylindrical member 75 by an electrically insulating member 93 which extends through a slot 95 formed in the wall of the cylinder 85 adjacent to the resistance element 77. The end of the housing 79 adjacent the spring 87 may be mounted to the bracket side 39 of the mounting assembly 29 so that a deceleration force will cause the member 75 to move axially against the urging of the spring 87 thereby moving the wiper contact 71 along the resistance element 77 so as to produce a proportionally variable voltage between the wiper contact 71 and one end of the resistance element 77 which is representative of the deceleration. The resulting voltage generates a signal which is transferred to the computer 19 by a pair of electrical conductors 97, 97' respectively.

The signal produced by the accelerometer 15 (or equivalently 15') is an analog signal having an amplitude which is continuously proportional to the deceleration sensed by the accelerometer 15. As is schematically shown in FIG. 5, the analog signal produced by the accelerometer 15 is received by an analog to digital converter 99 of the computer 19. The analog to digital converter 99 operates in response to a control signal from a processing unit, generally indicated by the reference numeral 101, to sample the analog signal and convert it into a corresponding digital deceleration signal in binary coded decimal form which is supplied to a data bus 103 of the computer 19. Such control signals from the processing unit 101 are supplied periodically to the analog to digital converter 99 at a suitable sampling rate, such as ten signals per second.

At the beginning of a skid test, when the brakes of the vehicle 13 are applied to initiate the skidding of the vehicle 13, the processing unit 101 responds to an actuating signal to effect storing of the digital deceleration signals in a random access memory unit 105, as will be explained below. The actuating signal may be provided by a skid detecting means in the form of a threshold level detector 107 receiving the digital deceleration signals from the data bus 103 and providing an actuating signal to the processing unit 101 when the value of the deceleration signals exceed a predetermined value. The threshold detector 107 may also incorporate a delay device therein to insure that the brakes of the vehicle are locked before sending such an actuating signal. Typical delay between starting to decelerate and locking brakes during a skid test is in the order of one tenth of a second.

Alternatively, the skid detecting means may be in the form of a conventional mercury position switch 109 wherein a globule of mercury is contained in a tube with a pair of electrodes (not shown). The position switch 109 is rendered conductive when the mercury globule engages the electrodes and non-conductive when the mercury globule moves away from the electrodes. As shown in FIG. 1, the mercury position switch 109 may be secured to the bracket side 39 of the mounting assembly 29 in a non-conductive position, and as the brakes of the vehicle 13 are applied to begin the skidding, the resulting deceleration force will move the mercury globule into contact with the electrodes to provide an actuating signal to the processing unit 101.

Upon receiving the actuating signal, the processing unit 101 will supply an address and control signal along an address and control bus 111 to the random access memory unit 105 enabling it to store data in the form of digital deceleration signals from the data bus 103 at a particular address, and with each incoming digital deceleration signal the memory addresses are incremented so as to provide a record of the deceleration history of the vehicle 13. The data storing continues until the value of the digital deceleration signals diminishes below the predetermined threshold level as the skidding test vehicle 13 comes to a stop. Alternatively, the data storing may be terminated when the mercury position switch 109 no longer provides an actuating signal to the processing unit 101. In this manner deceleration data are stored with respect to time, that is, with respect to predetermined increments of time which can be subsequently determined.

Thereafter, the deceleration data stored in the random access memory unit 105 of the computer 19 may be processed according to predetermined mathematical operations stored as programs in a read only memory unit 113 to derive information from the skid test. As previously mentioned, there are a plurality of selector switches 21 each keyed to or corresponding to a different program of mathematical operations. The operation of a particular selector switch 21 provides a signal to the processing unit 101 where in turn the processing unit 101 supplies address and control signals to the read only memory unit 113 so as to receive the program instructions for a particular mathematical operation. The processing unit 101 then supplies appropriate address and control signals to the random access memory unit 105 for receiving the stored deceleration data and processing same in an arithmetic-logic portion of the processing unit 101 according to the mathematical operations of the selected program. The information resulting from the processed deceleration data is then supplied to an output circuit 115 which acts in response to a control signal from the processing unit 101 to present the information on the digital display panel 23 or to operate the printer 25 to print the information on a tape or the like. Further details concerning the computer 19 are not set forth herein, as the computer 19 may be conventional in type, for example, a typical computer arrangement is shown in U.S. Pat. No. 4,020,286 which may be referred to for further details.

As previously mentioned, the deceleration data stored in the random access memory unit 105 may be processed according to several different programs, and one of the programs may provide the time duration of the skid tests in seconds by dividing the total number of stored deceleration samples by the rate at which they were stored in the random access memory unit 105, for example ten data samples per second. Another program may provide an address by address readout of all of the deceleration values thereby providing a detailed deceleration history of the vehicle 13 during the skid test. Still another program may provide an average deceleration value by adding the value of all of the data samples and dividing by the total number of data samples. A further program may provide a determination of the median value of deceleration.

Still another program may utilize the average or mean value of deceleration to determine the coefficient of friction. As is known, the coefficient of friction is the ratio of the force opposing the sliding movement of one object over another to the force pressing the objects together. However, in the case of a skidding vehicle, the opposing force is equal to the product of the vehicle mass and the deceleration of the vehicle, and the force pressing the vehicle to the road is the vehicle weight which may be expressed as the product of the vehicle mass and the acceleration due to gravity. Accordingly, the coefficient of friction ratio reduces to the deceleration of the vehicle with respect to acceleration due to gravity. Since the latter is known to be 32 ft./sec./sec., the coefficient of friction is a dimensionless number determined by dividing a deceleration value in ft./sec./sec. by the number 32.

Moreover, the coefficient of friction value may be used to calculate the skid length of the test vehicle 13 according to the formula.

Skid Length in feet = [skid time in seconds × 32 feet/second$^2$ × coefficient of friction/(1.47 feet-hours/miles-second)]$^2$/F = (Initial speed) $^2$/(coefficient of friction × F).

When the calculated skid length is known, the initial speed of the test vehicle 13 is determined according to the formula:

Initial Speed in miles per hour = (Skid Length in feet × F × Coef. of Friction)$^{\frac{1}{2}}$.

Still another program may provide for calculating the braking efficiency of the vehicle 13 as compared to a standard braking efficiency on a dry road providing an 80% coefficient of friction which is just slightly greater than may be expected according to the motor vehicle standards required by the National Highway Safety Administration. Accordingly, the braking efficiency may be calculated by dividing 80% into the coefficient of friction resulting from the skid tests. Moreover, an additional program may provide for calculating a distance factor required for the vehicle 13 to skid to a stop from an initial speed as compared to a skid length of a vehicle operating with standard braking efficiency as previously discussed. Accordingly, the distance factor may be determined by dividing the skid length corresponding to an initial speed with an 80% coefficient of friction into the skid length of the test vehicle 13 resulting from the same initial speed.

In another embodiment of the present invention, the accelerometer 15 may be replaced by a conventional radar speed detector 117 which produces a digital signal indicative of the speed of a moving vehicle for use in a digital display of the detected speed. The radar speed detector 117 may be secured by suitable means to the window 17 of the test vehicle 13 or the like so as to be aimed forward of the vehicle 13. It is foreseen that the radar detector 117 and associated equipment could be hand held outside the vehicle and directed at same. As shown in FIG. 5, the digital speed signal from the radar speed detector 117 is supplied by a suitable electrical connection to the data bus 103 of the computer 19 for processing by the processing unit 101 to produce a digital deceleration signal.

It is foreseen that a speedometer or odometer output could be utilized to determine initial and final speeds during deceleration and other information for input to the computer 19.

As is known, deceleration is the change in speed per unit of time, and the value of the speed signal may be sampled periodically to determine the change in speed in miles per hour per sampling period. The digital speed signal from the radar speed detector 117 is received by the processing unit 101 where it is sampled and processed in the arithmetic-logic portion at a rate of ten samples per second. The value of each incoming speed sample is subtracted from the value of the preceeding speed sample to provide a change in speed in miles per hour per sampling time period, and this value is multiplied by the rate of sampling and 1.47 (hour-foot/mile-second) so as to express the deceleration value in feet per second per sampling time period and thereby produce a digital deceleration signal which is supplied to the data bus 103 for storing in the random access memory unit 113.

As before, the processing unit 101 may effect storing of the digital deceleration signals in the random access memory unit 105 in response to an actuating signal provided by skid detecting means in the form of the threshold level detector 107, the mercury position switch 109, or the like and upon completion of the skid test the stored deceleration data may be processed according to predetermined mathematical operations to derive information from the skid test.

It is further noted that the present invention may be modified to provide deceleration related data, including a coefficient of friction related to a vehicle braking on a surface, even if the surface is curved. This may be accomplished by providing a second accelerometer essentially equivalent to accelerometer 15 but having an axis which is perpendicular thereto but which is in a horizontal plane. Data would be transferred from both accelerometers to the computer which would geometrically combine same to arrive at the total deceleration of the vehicle. It is noted that the same concept could be utilized for vertical variations in a road wherein three mutually perpendicular accelerometers would be combined.

It is to be understood that while certain embodiments of the present invention have been illustrated and described herein, it is not to be limited to the specific forms or arrangements of parts described and shown.

What is claimed and desired to secure by Letters Patent is:

1. Apparatus for providing a deceleration history of a vehicle during a skid test, comprising:
   (a) sensing means for sensing the decelerating movement of a vehicle during a skid test and producing a signal representative of the decelerating movement of the vehicle;
   (b) computer means receiving the signal from said sensing means and periodically sampling and processing the signal to periodically produce a digital deceleration signal indicative of the deceleration of the skidding vehicle;
   (c) skid detecting means for detecting the beginning of a skid test and providing an actuating signal;
   (d) said computer means having memory means for storing the digital deceleration signals; and
   (e) said computer means being operable in response to the actuating signal for effecting storage of the digital deceleration signals in said memory means so as to provide a deceleration history of the skid test.

2. The apparatus according to claim 1 wherein:
   (a) said sensing means is in the form of an accelerometer operable in response to the deceleration of the vehicle for providing an analog signal having a magnitude representative of the rate of deceleration of the vehicle;
   (b) said computer means includes an analog to digital converter receiving the analog signal from said accelerometer and is operable in response to a control signal for converting the analog signal into a digital deceleration signal corresponding to the magnitude of the analog signal; and (c) said computer means further includes processing means connected in controlling relation to said analog to digital converter and periodically supplying a control signal to said analog to digital converter.

3. The apparatus according to claim 1 wherein:

(a) said sensing means is in the form of a radar speed detector providing a digital speed signal representative of the decelerating speed of the vehicle; and (b) said computer means includes processing means receiving the digital speed signal from said radar speed detector and periodically processing the digital speed signal to determine the deceleration in speed during a sampling period and produce a digital deceleration signal.

4. The apparatus according to claim 1, 2 or 3 wherein:

(a) said skid detecting means is an electrical position switch of a type containing mercury liquid movable to render the switch electrically conductive in one position and electrically non-conductive in another position; and (b) said electrical position switch is supported in an electrically non-conductive position and is rendered electrically conductive by the movement of the mercury liquid in response to the deceleration of the vehicle so as to provide an actuating signal.

5. The apparatus according to claim 1, 2 or 3 wherein:

(a) said skid detecting means is a threshold level detector receiving said digital deceleration signals and being operable to provide an actuating signal in response to detecting a digital deceleration signal having a value greater than a predetermined threshold value.

6. The apparatus according to claim 2 or 3 wherein:

(a) said processing means is operable to process the stored deceleration signals according to any one of a plurality of predetermined mathematical operations and provide output signals indicative of the results of the mathematical operations in response to a signal corresponding to a selected one of the predetermined mathematical operations; and (b) said computer means has switch means selectively operable to provide a signal to said processing means to effect processing of the stored deceleration signals according to a selected mathematical operation.

7. The apparatus according to claim 6 wherein said computer means further comprises:

(a) a display panel for displaying the results of the mathematical operations;

(b) a printer for printing the results of the mathematical operations; and (c) output means receiving the output signals from said processing means and being connected in controlling relation with said display panel and said printer for effecting the display or printing of the results of the mathematical operations.

8. A method for determining coefficient of friction of a surface relative to tires of a vehicle and related information, including the steps of:

(a) operating the vehicle on the surface;

(b) braking the vehicle on the surface such that the wheels of the vehicle are locked and not free to rotate until the vehicle is substantially stopped;

(c) positioning a deceleration determining mechanism in the vehicle so as to determine deceleration rates of the vehicle during braking along a path of motion of the vehicle;

(d) at least periodically sampling deceleration data as determined by the deceleration determining mechanism during braking; and (e) performing mathematical operations on said data for determining the coefficient of friction and related information.

9. The method according to claim 8 wherein:

(a) the deceleration determining mechanism is an accelerometer.

10. The method according to claim 8 wherein:

(a) the deceleration determining mechanism comprises a radar device; and includes the steps of:

(b) taking velocity readings with the radar at preselected increments of time; and (c) determining a deceleration for each increment of time based upon a change in velocity between each increment and a previous increment.

11. The method according to claim 8, 9 or 10 wherein:

(a) the mathematical steps are performed by a computer; and including the steps of:

(b) taking the deceleration data on a continuous basis during braking;

(c) using an analog to digital converter to sample deceleration values at discreet time intervals during braking; and (d) transferring the discreet time interval sampled deceleration values to the computer.

12. The method according to claim 11 including the step of:

(a) initiating the periodic sampling of deceleration data by detecting means for determining the substantial beginning and end of the braking of the vehicle.

* * * * *